US012722633B2

(12) United States Patent
Sugiyama et al.

(10) Patent No.: US 12,722,633 B2
(45) Date of Patent: Sep. 1, 2026

(54) MOVING BODY CONTROL DEVICE, CONTROL METHOD AND STORAGE MEDIUM

(71) Applicant: HONDA MOTOR CO., LTD., Tokyo (JP)

(72) Inventors: Akira Sugiyama, Tokyo (JP); Yuta Okazaki, Tokyo (JP); Naoto Sen, Tokyo (JP); Hiroyuki Baba, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 18/237,755

(22) Filed: Aug. 24, 2023

(65) Prior Publication Data

US 2024/0067176 A1 Feb. 29, 2024

(30) Foreign Application Priority Data

Aug. 31, 2022 (JP) ................................ 2022-137853

(51) Int. Cl.
*B60W 30/095* (2012.01)
*B60W 30/14* (2006.01)
(Continued)

(52) U.S. Cl.
CPC ........ *B60W 30/143* (2013.01); *B60W 30/165* (2013.01); *B60W 30/18163* (2013.01);
(Continued)

(58) Field of Classification Search
CPC ............. B60W 30/143; B60W 30/165; B60W 30/18163; B60W 50/14; B60W 2050/143;
(Continued)

(56) References Cited

U.S. PATENT DOCUMENTS

2007/0005218 A1* 1/2007 Ueyama ................ B60W 30/16 701/96
2019/0227546 A1* 7/2019 Sato ..................... G05D 1/0061
(Continued)

FOREIGN PATENT DOCUMENTS

JP 2003-025868 A 1/2003
JP 2005-263099 A 9/2005
(Continued)

OTHER PUBLICATIONS

Aug. 19, 2025, Translation of Japanese Office Action issued for related JP Application No. 2022-137853.

*Primary Examiner* — Hossam M Abd El Latif
(74) *Attorney, Agent, or Firm* — Paratus Law Group, PLLC

(57) ABSTRACT

A control device for a moving body is configured to execute following movement control under which a movement speed of a moving body is controlled to follow a preceding moving body moving ahead of the moving body, and constant speed movement control under which the movement speed of the moving body is controlled to be a predetermined target. The control device is configured to execute, when the preceding moving body is detected, the following movement control, and execute, when the preceding moving body is no longer detected during execution of the following movement control, the constant speed movement control under which the movement speed of the moving body is controlled such that the movement speed of the moving body becomes the target speed based on a movement speed of a surrounding moving body moving in a surrounding area of the moving body.

13 Claims, 7 Drawing Sheets

(51) Int. Cl.
*B60W 30/165* (2020.01)
*B60W 30/18* (2012.01)
*B60W 40/105* (2012.01)
*B60W 50/14* (2020.01)

(52) U.S. Cl.
CPC ....... *B60W 50/14* (2013.01); *B60W 2050/143* (2013.01); *B60W 2050/146* (2013.01); *B60W 2554/4042* (2020.02); *B60W 2554/80* (2020.02)

(58) Field of Classification Search
CPC ... B60W 2050/146; B60W 2554/4042; B60W 2554/80; B60W 30/16; B60W 30/0953; B60W 30/0956; B60W 40/105
USPC ............................................................ 701/96
See application file for complete search history.

(56) References Cited

U.S. PATENT DOCUMENTS

| | | | | |
|---|---|---|---|---|
| 2020/0307600 | A1* | 10/2020 | Sato | G08G 1/167 |
| 2020/0391764 | A1* | 12/2020 | Gotou | B60W 30/162 |
| 2022/0185281 | A1 | 6/2022 | Noguchi | |
| 2023/0124903 | A1* | 4/2023 | Yamaguchi | B60W 30/16 701/70 |
| 2023/0382375 | A1* | 11/2023 | Kurihashi | B60W 30/18163 |

FOREIGN PATENT DOCUMENTS

| | | | | |
|---|---|---|---|---|
| JP | 2008049888 | A | * | 3/2008 |
| JP | 2009-018727 | A | | 1/2009 |
| JP | 2022-095183 | A | | 6/2022 |

* cited by examiner

MOVING BODY CONTROL DEVICE, CONTROL METHOD AND STORAGE MEDIUM

CROSS-REFERENCE RELATED ARTS

This application is based on and claims priority under 35 USC 119 from Japanese Patent Application No. 2022-137853 filed on Aug. 31, 2022.

TECHNICAL FIELD

The present disclosure relates to a moving body control device, a control method, and a storage medium storing a control program for executing following movement control and constant speed movement control on the moving body.

BACKGROUND ART

In recent years, active efforts have been made to provide access to a sustainable transportation system in consideration of vulnerable people among traffic participants. In order to implement the above object, research and development for further improving traffic safety and convenience through research and development related to driving assistance technology and self-driving technology have been focused on.

As an example of driving assistance technology, JP2009-18727A, JP2005-263099A, JP2003-25868A disclose adaptive cruise control (ACC). Generally, in the ACC, when a preceding vehicle moving ahead of a host vehicle is detected, following travel control for adjusting a travel speed of the host vehicle in accordance with a movement speed of the preceding vehicle is executed, and when the preceding vehicle is no longer detected, constant speed travel control for traveling at a target speed set in advance by a user (for example, a driver) is executed.

SUMMARY

However, in the related art, when the preceding vehicle is no longer detected during execution of the following travel control, the user needs to perform additional operations such as cancellation of the ACC, an accelerator/brake operation, and resetting of the preset target speed in order to move the host vehicle according to a surrounding vehicle.

The present disclosure provides a control device, a control method, and a control program for a moving body that are capable of moving the moving body according to a surrounding moving body even when a user does not perform any additional operation in a case where a preceding moving body is no longer detected during execution of following movement control.

According to an aspect of the present disclosure, there is provided a control device for a moving body, the control device being configured to execute following movement control under which a movement speed of a moving body is controlled to follow a preceding moving body moving ahead of the moving body, and constant speed movement control under which the movement speed of the moving body is controlled to be a predetermined target speed, in which the control device is configured to execute, when the preceding moving body is detected, the following movement control, and execute, when the preceding moving body is no longer detected during execution of the following movement control, the constant speed movement control under which the movement speed of the moving body is controlled such that the movement speed of the moving body becomes the target speed based on a movement speed of a surrounding moving body moving in a surrounding area of the moving body.

According to another aspect of the present disclosure, there is provided a control device for a moving body, the control device being configured to execute following movement control under which a movement speed of a moving body is controlled to follow a preceding moving body moving ahead of the moving body, and constant speed movement control under which the movement speed of the moving body is controlled to be a predetermined speed, in which the control device is configured to execute, when the preceding moving body is detected, the following movement control, and execute, when the preceding moving body is no longer detected during execution of the following movement control, the constant speed movement control under which an acceleration of the moving body is controlled such that the movement speed of the moving body becomes a speed based on a movement speed of a surrounding moving body moving in a surrounding area of the moving body.

According to another aspect of the present disclosure, there is provided a control method for a moving body, including:

executing, by a computer, following movement control under which a movement speed of a moving body is controlled to follow a preceding moving body moving ahead of the moving body when the preceding moving body is detected, and constant speed movement control under which the movement speed or an acceleration of the moving body is controlled such that the movement speed of the moving body becomes a speed based on a movement speed of a surrounding moving body moving in a surrounding area of the moving body when the preceding moving body is no longer detected during execution of the following movement control.

According to another aspect of the present disclosure, there is provided a non-transitory computer readable storage medium storing a control program for a moving body causing a computer to execute the control method.

According to the present disclosure, a moving body may be moved according to a surrounding moving body in a surrounding area of the moving body even when a user does not perform any additional operation in a case where a preceding moving body is no longer detected during execution of following movement control.

BRIEF DESCRIPTION OF DRAWINGS

Exemplary embodiment(s) of the present invention will be described in detail based on the following figures, wherein.

DESCRIPTION OF EMBODIMENTS

First Embodiment

Figure 1:
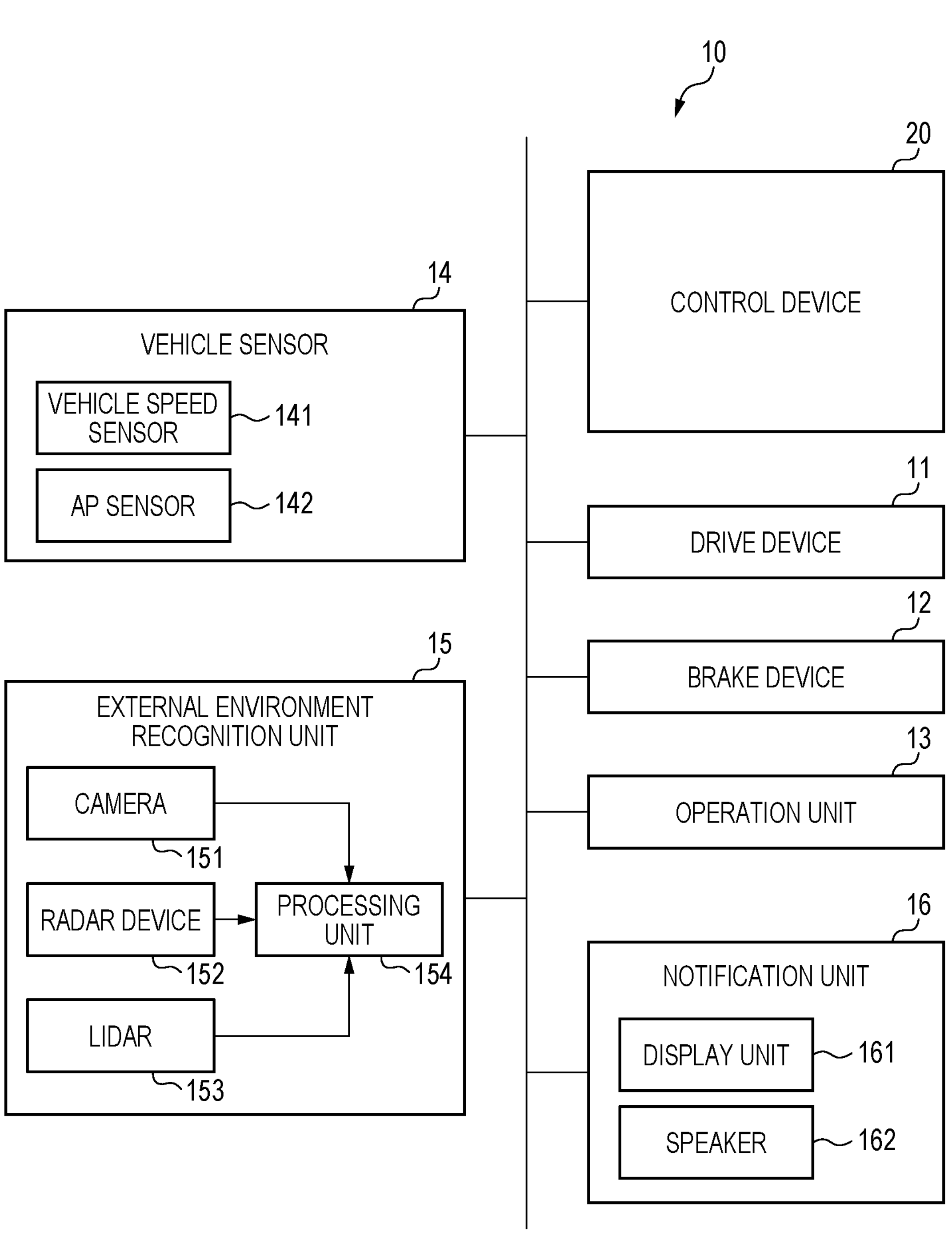
FIG. 1 shows an example of a vehicle 10 including a control device 20.

Hereinafter, a first embodiment of a control device, a control method, and a storage medium storing a control program according to the present disclosure will be described with reference to the accompanying drawings. The drawings are viewed in directions of reference numerals. In addition, in the present description and the like, in order to simplify and clarify the description, each of front, rear, left, and right directions is described according to a direction viewed from a user (for example, a driver) of a moving body.

(Vehicle)

A vehicle 10 shown in FIG. 1 is an example of the moving body in the present disclosure, and is an automobile including a drive device 11 as a drive source, and wheels (not shown) including drive wheels driven by power of the drive device 11 and steerable driven wheels. In the present embodiment, the vehicle 10 is a four-wheeled automobile including a pair of left and right front wheels and a pair of left and right rear wheels. In addition, the drive device 11 may drive the pair of left and right front wheels, the pair of left and right rear wheels, or the four wheels including the pair of left and right front wheels and the pair of left and right rear wheels. Either the front wheels or the rear wheels may be turning wheels, or the front wheels and the rear wheels may both be steerable driven wheels.

The drive device 11 includes, for example, an electric motor and an electric motor electronic control unit (ECU) to control the electric motor. The electric motor ECU controls the electric motor based on a detection result of an accelerator position sensor (hereinafter also referred to as the AP sensor) 142 of the vehicle 10 and control information from a control device 20 to be described later. In addition, the drive device 11 may include an internal combustion engine, such as a gasoline engine or a diesel engine, and a transmission instead of or in addition to the electric motor. In a case where the drive device 11 includes the internal combustion engine and the transmission, the drive device 11 further includes an ECU that controls the internal combustion engine and the transmission.

The vehicle 10 further includes, for example, a brake device 12, an operation unit 13, a vehicle sensor 14, an external environment recognition unit 15, a notification unit 16, and the control device 20. Constituent elements of the vehicle 10 are communicably connected with each other via a wired or wireless communication network.

The brake device 12 decelerates the vehicle 10 by braking each wheel. The brake device 12 includes, for example, a brake caliper, a cylinder that transmits hydraulic pressure to the brake caliper, an electric motor that generates the hydraulic pressure in the cylinder, and a brake ECU. The brake ECU controls the electric motor of the brake device 12 based on a detection result of a brake pedal sensor of the vehicle 10 and control information from the control device 20 such that a predetermined brake torque is output to each wheel.

The operation unit 13 receives various operations from a user (for example, a driver of the vehicle 10, hereinafter simply referred to as "driver"). For example, the operation unit 13 is provided on a steering wheel (not shown), and includes a physical operation button that outputs an operation signal corresponding to an operation received from the user to the control device 20. As will be described in detail later, the driver may execute travel speed control and set a target speed of constant speed travel control via the operation unit 13. A configuration of the operation unit 13 is not limited to a physical operation button, and may be implemented by a touch panel or the like. In addition, the operation unit 13 may not be provided on the steering wheel. Further, the operation unit 13 may be configured to recognize a voice, a gesture, or the like of the user to receive various operations from the user.

The vehicle sensor 14 acquires information on a movement state of the vehicle 10 and outputs the acquired information to the control device 20. For example, the vehicle sensor 14 includes a vehicle speed sensor 141 that acquires information indicating a travel speed (that is, a movement speed, hereinafter, also referred to as "vehicle speed") of the vehicle 10 and the AP sensor 142 that detects an accelerator position of the vehicle 10. In addition, the vehicle sensor 14 may include another sensor such as a steering angle sensor that detects a steering angle of the vehicle 10.

The external environment recognition unit 15 includes, for example, a camera 151, a radar device 152, laser imaging detection and ranging (LIDAR) 153, and a processing unit 154. The camera 151 captures an image of a surrounding area of the vehicle 10 including a front area of the vehicle 10. The radar device 152 can detect a position of an object in the surrounding area of the vehicle 10, and is, for example, a radar device using radio waves in a millimeter wave band. The LIDAR 153 measures, by using predetermined laser light, a distance to an object (target object) in the surrounding area of the vehicle 10. The processing unit 154 is implemented by an ECU, processes information acquired by the camera 151, the radar device 152, and the LIDAR 153, recognizes peripheral information on the vehicle 10, and detects, from among the peripheral information on the vehicle 10, presence, position, speed, and the like of a vehicle (specifically, a preceding vehicle M2 or a surrounding vehicle M3 to be described later) traveling in the surrounding area of the vehicle 10. Then, the processing unit 154 outputs a detection result to the control device 20.

The external environment recognition unit 15 may not include the processing unit 154. In this case, the external environment recognition unit 15 outputs the information obtained from the camera 151, the radar device 152, and the LIDAR 153 to the control device 20, and the control device 20 processes the information to detect the presence, the position, the speed, and the like of the vehicle traveling in the surrounding area of the vehicle 10. It is not necessary for the external environment recognition unit 15 to include all of the camera 151, the radar device 152, and the LIDAR 153.

The external environment recognition unit 15 may include at least one of such components. In addition, the external environment recognition unit 15 may include another detection device different from the camera 151, the radar device 152, and the LIDAR 153.

The notification unit 16 notifies the user of the vehicle 10 of predetermined matters. Specifically, the notification unit 16 includes a display unit 161 that visually notifies the user and a speaker 162 that audibly notifies the user. The display unit 161 is, for example, a meter panel provided at a position facing a driver seat of the vehicle 10, and displays the vehicle speed of the vehicle 10 and the like. The display unit 161 may display a first target speed and a second target speed to be described later. The speaker 162 outputs, for example, voice guidance of a navigation device (not shown).

The control device 20 integrally controls the entire vehicle 10. The control device 20 is implemented by, for example, a computer (for example, an ECU) including a central processing unit (CPU) that performs various types of calculation, a storage device that stores various types of information, and an input and output device that controls input and output of data between inside and outside of the control device 20. That is, a function of the control device 20 may be implemented by, for example, the CPU executing a predetermined control program stored in advance in the storage device. In addition, a part or all of functions of the control device 20 may be implemented by hardware such as a large-scale integration (LSI), an application-specific integrated circuit (ASIC), a field-programmable gate array (FPGA), or a graphics processing unit (GPU). Further, a part or all of functions of the control device 20 may be implemented by cooperation of software and hardware.

(Travel Speed Control)

Next, travel speed control for controlling the travel speed of the vehicle 10 will be described with reference to FIGS. 2 to 7. Hereinafter, the vehicle 10 whose travel speed is to be controlled in the travel speed control according to the present embodiment is also referred to as a host vehicle M1.

A road RD shown in FIGS. 2 and 3 includes travel lanes L1 to L3 whose traveling direction is along a direction from below to above in FIGS. 2 and 3. The travel lane L2 is a travel lane adjacent to the travel lane L1 on a left side of the travel lane L1. In addition, the travel lane L3 is a travel lane adjacent to the travel lane L1 on a right side of the travel lane L1.

Figure 2:
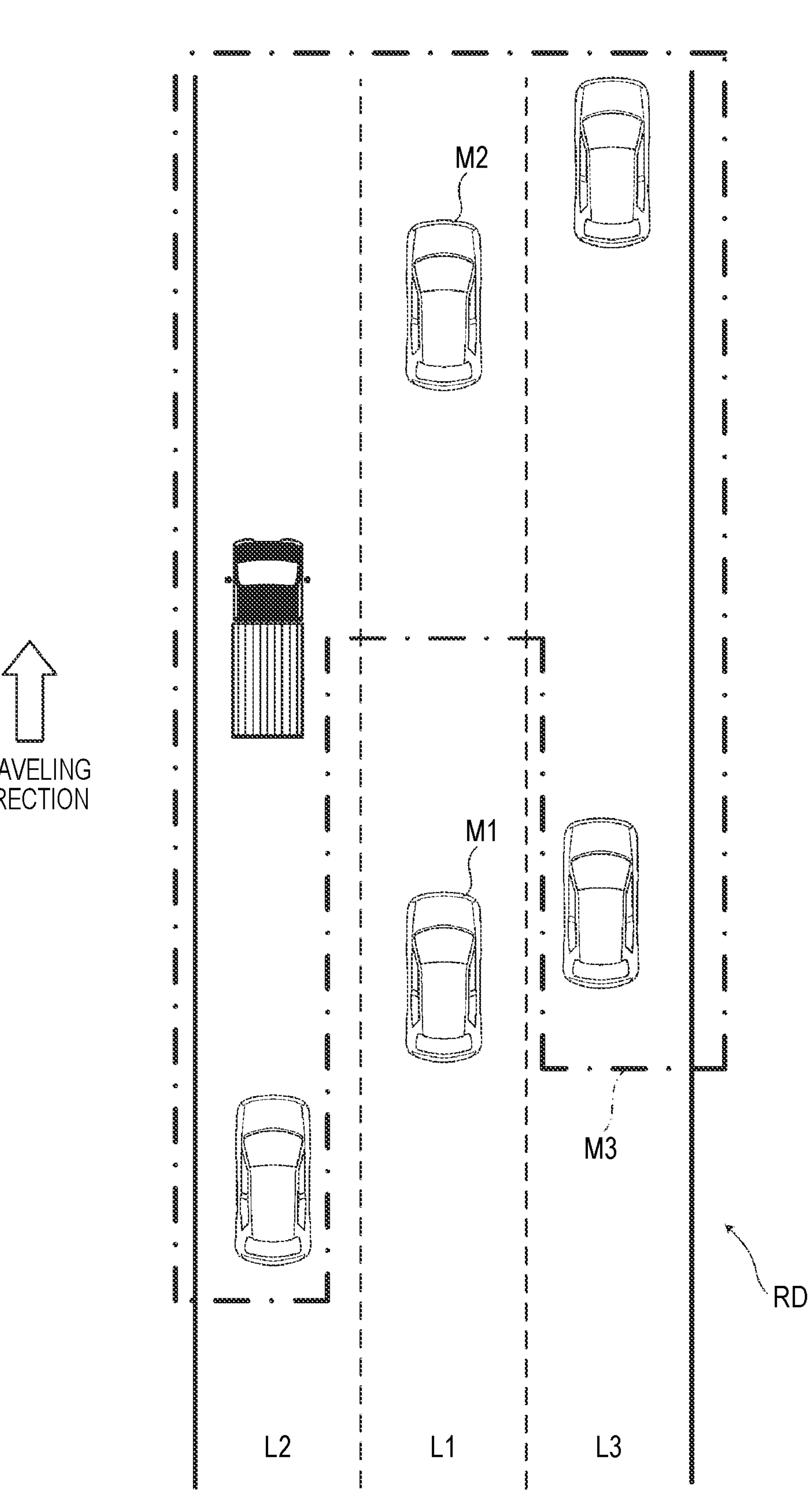
FIG. 2 is a schematic diagram of a state when a host vehicle M1 executes following travel control to follow a preceding vehicle M2.
Figure 3:
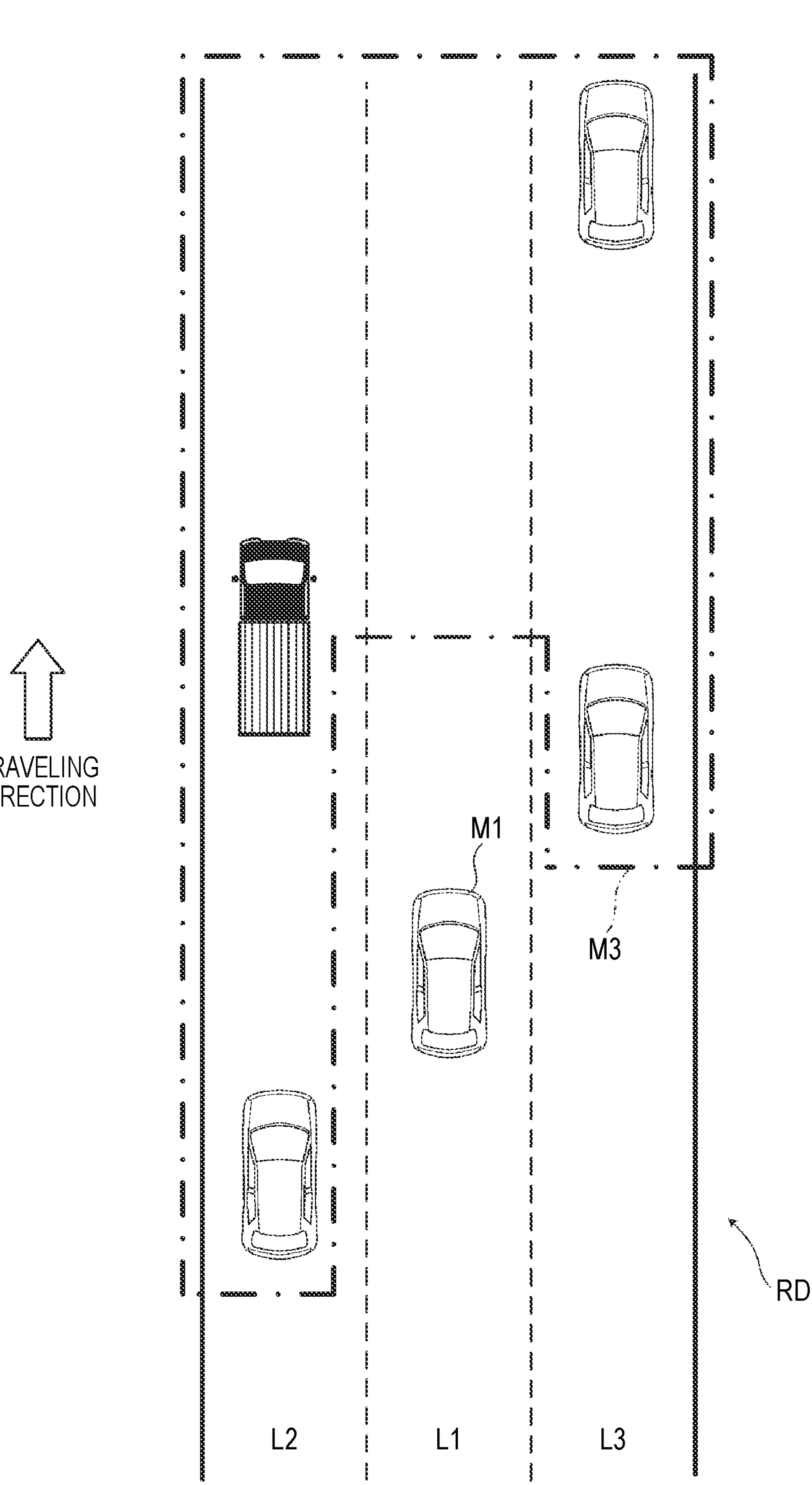
FIG. 3 is a schematic diagram of a state when the host vehicle M1 executes constant speed travel control in a state in which the preceding vehicle M2 is not detected.

In examples shown in FIGS. 2 and 3, the host vehicle M1 travels in the travel lane L1 along the traveling direction of the travel lane L1. In addition, in the example shown in FIG. 2, there is the other vehicle M2 that travels in the travel lane L1 similarly to the host vehicle M1 ahead of the host vehicle M1 in the travel lane L1. Hereinafter, a vehicle traveling ahead of the host vehicle M1 in the same travel lane as the host vehicle M1 in this manner is also referred to as the preceding vehicle M2. As shown in FIG. 2, in the case where such a preceding vehicle M2 is present, the preceding vehicle M2 is detected by the external environment recognition unit 15 of the host vehicle M1. On the other hand, in the example shown in FIG. 3, since there is no vehicle ahead of the host vehicle M1 in the travel lane L1, the preceding vehicle M2 is not detected.

In the examples shown in FIGS. 2 and 3, a vehicle that travels in a surrounding area of the host vehicle M1, specifically, in the travel lane L1 in which the host vehicle M1 travels or in the travel lane L2 or L3 adjacent to the travel lane L1 and having the same traveling direction as the travel lane L1 in the vicinity of the host vehicle M1 is referred to as the surrounding vehicle M3. In a case where such a surrounding vehicle M3 is present, the surrounding vehicle M3 is detected by the external environment recognition unit 15 of the host vehicle M1. The surrounding vehicle M3 includes the preceding vehicle M2.

The travel speed control in the present embodiment includes following travel control under which the travel speed of the host vehicle M1 is controlled to follow the preceding vehicle M2, and constant speed travel control under which the travel speed of the host vehicle M1 is set to a predetermined target speed. When the user make an instruction, via the operation unit 13, to execute the travel speed control, the control device 20 executes the travel speed control. In the travel speed control, the control device 20 controls the travel speed of the host vehicle M1 by controlling an output of the drive device 11 or controlling a brake torque by the brake device 12.

The following travel control is control under which the travel speed of the host vehicle M1 is adjusted such that the host vehicle M1 travels at a target following speed when the preceding vehicle M2 is detected in the travel lane L1 of the host vehicle M1 as shown in FIG. 2. As the target following speed, a speed at which an inter-vehicle distance between the host vehicle M1 and the preceding vehicle M2 is kept constant is set based on a relative speed or a relative position with respect to the preceding vehicle M2. For example, when performing the following travel control, the control device 20 sets a speed at which the relative speed with respect to the preceding vehicle M2 is 0 (zero) as the target following speed, and performs the following travel control based on the target following speed. In such following travel control, the inter-vehicle distance between the host vehicle M1 and the preceding vehicle M2 may be kept constant, and the user may drive while safety is ensured.

The constant speed travel control is control under which the travel speed of the host vehicle M1 is adjusted to a speed within a predetermined allowable range including a target speed when the preceding vehicle M2 is not detected as shown in FIG. 3. In the constant speed travel control, for example, the travel speed of the host vehicle M1 is brought close to the predetermined target speed by performing feedback control based on a difference between a current travel speed and the predetermined target speed. Here, the target speed in the constant speed travel control includes the first target speed set in advance by the user.

The first target speed is also an upper limit value of the travel speed of the host vehicle M1 in the following travel control, and the host vehicle M1 travels at the first target speed or a lower speed during the following travel control. In order to prevent the host vehicle M1 from being left behind by the preceding vehicle M2 during execution of the following travel control, a high speed may be set as the first target speed.

Such travel speed control is generally referred to as adaptive cruise control (ACC). When the ACC is executed whereas the preceding vehicle M2 is not detected, the host vehicle M1 first travels by the constant speed travel control based on the first target speed until the preceding vehicle M2 is detected. Specifically, at this time, the host vehicle M1 accelerates to the first target speed and travels at a constant speed at the first target speed after reaching the first target speed. When the preceding vehicle M2 is detected during execution of the constant speed travel control, the host vehicle M1 travels under the following travel control based on the target following speed. Specifically, at this time, the host vehicle M1 decelerates from the first target speed to the target following speed and follows the preceding vehicle M2 at the target following speed. Thereafter, when the preceding vehicle M2 is no longer detected during execution of the following travel control, the host vehicle M1 travels under the constant speed travel control again.

As described above, a relatively high speed may be set as the first target speed in the constant speed travel control. Therefore, when the preceding vehicle M2 is no longer detected during the execution of the following travel control and the travel speed control is shifted to the constant speed travel control based on the first target speed, the travel speed of the host vehicle M1 may be sometimes excessively higher than a travel speed of the surrounding vehicle M3. In such a case, the user who desires to cause the host vehicle M1 to travel according to the surrounding vehicle M3 needs to perform additional operations such as cancellation of the ACC (travel speed control), an accelerator/brake operation, and resetting the first target speed, which is troublesome.

In order to avoid the travel speed of the host vehicle M1 from being excessively high due to the shift to the constant speed travel control, for example, it is also conceivable to maintain the travel speed of the host vehicle M1 when the preceding vehicle M2 is no longer detected. However, in this case, when the travel speed of the surrounding vehicle M3 is higher than the travel speed of the host vehicle M1 when the preceding vehicle M2 is no longer detected, the host vehicle M1 may be left behind by the surrounding vehicle M3.

Therefore, in the travel speed control in the present embodiment, the target speed in the constant speed travel control further includes the second target speed based on the travel speed of the surrounding vehicle M3, and is selectively set from the first target speed and the second target speed.

Hereinafter, the travel speed control in the present embodiment will be described in detail. In the following description, an example in which the second target speed is lower than the first target speed will be described.

When the preceding vehicle M2 is no longer detected during execution of the following travel control, the control device 20 executes the constant speed travel control under which the travel speed of the host vehicle M1 is controlled such that the travel speed of the host vehicle M1 becomes the second target speed. For example, when the preceding vehicle M2 shown in FIG. 2 performs lane-change from the travel lane L1 to the other travel lane L2 or L3, the preceding vehicle M2 is no longer detected, and the travel speed control is shifted from the following travel control to the constant speed travel control. At this time, the control device 20 adjusts the travel speed such that the travel speed of the host vehicle M1 becomes the second target speed. By the constant speed travel control based on the second target speed, the host vehicle M1 is accelerated or decelerated from the target following speed to the second target speed, and travels at a constant speed at the second target speed after reaching the second target speed.

Figure 4:
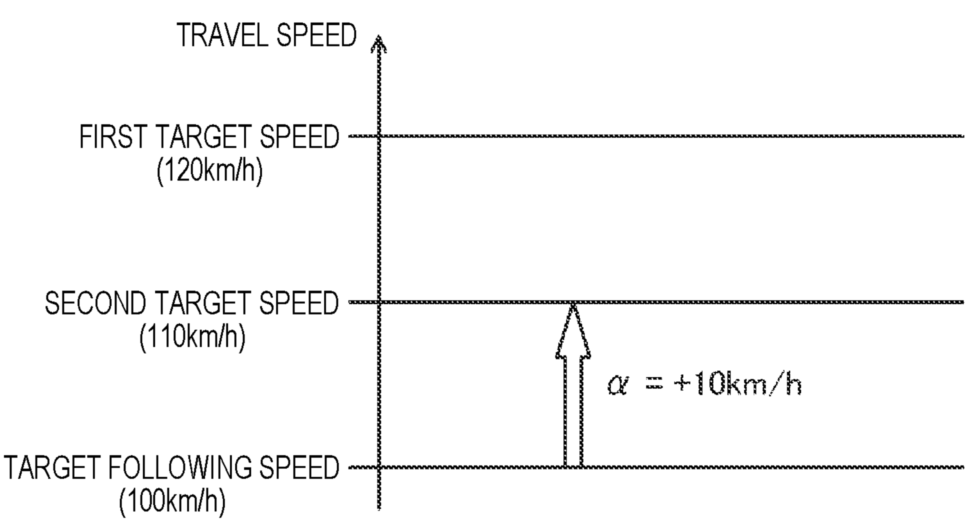
FIG. 4 shows that the host vehicle M1 is accelerated from a target following speed to a second target speed when shifting from the following travel control to the constant speed travel control.
Figure 5:
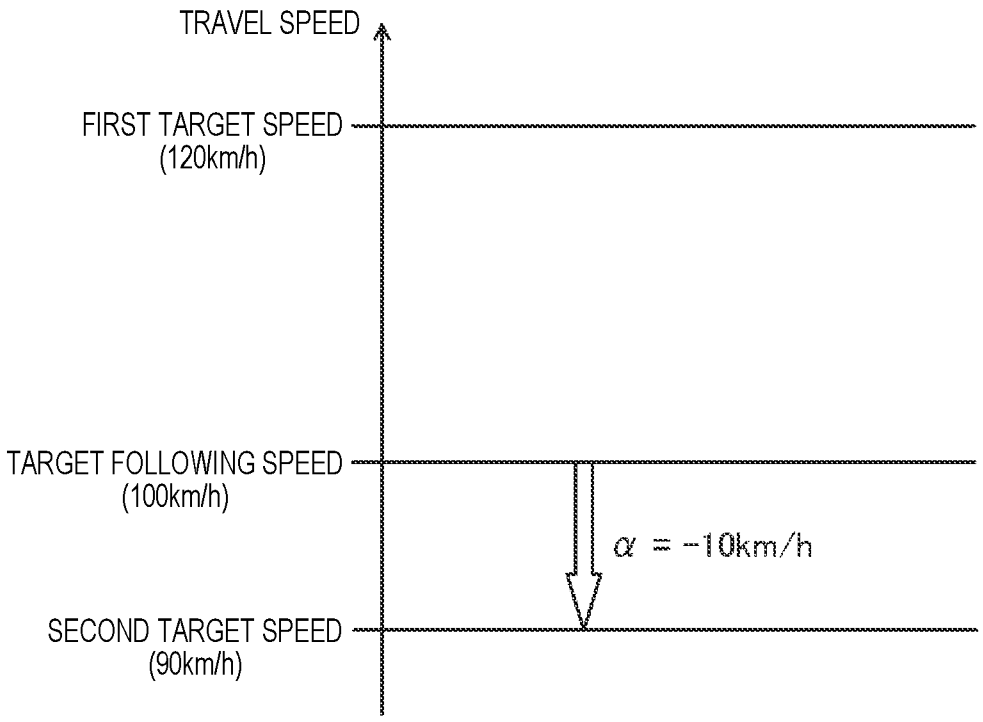
FIG. 5 shows that the host vehicle M1 is decelerated from the target following speed to the second target speed when shifting from the following travel control to the constant speed travel control.

As shown in FIGS. 4 and 5, the second target speed is acquired by adding a predetermined calculation value a based on the travel speed of the surrounding vehicle M3 to the target following speed. The calculation value a in the present embodiment is calculated based on the travel speed of the surrounding vehicle M3 traveling in the travel lanes L1 to L3 detectable by the external environment recognition unit 15. The target following speed used for the calculation is, for example, an average speed or a maximum speed of the preceding vehicle M2 within a predetermined time, or a travel speed of the preceding vehicle M2 immediately before the preceding vehicle M2 is no longer detected. In addition, the travel speed of the surrounding vehicle M3 is, for example, an average speed or a maximum speed of the surrounding vehicle M3 within a predetermined time, or a travel speed of the surrounding vehicle M3 immediately before the preceding vehicle M2 is no longer detected.

The calculation value a is, for example, a relative speed of the surrounding vehicle M3 with respect to the host vehicle M1. FIG. 4 shows a relationship among the first target speed, the second target speed, and the target following speed when the travel speed of the surrounding vehicle M3 is higher than the target following speed. For example, when the target following speed of the host vehicle M1 is 100 km/h and the travel speed of the surrounding vehicle M3 is 110 km/h, the control device 20 sets the calculation value a to +10 km/h based on the relative speed of the surrounding vehicle M3 with respect to the host vehicle M1, and acquires the second target speed of 110 km/h by adding the calculation value $\alpha$=+10 km/h to the target following speed of 100 km/h. That is, the host vehicle M1 accelerates from the target following speed to the second target speed.

On the other hand, FIG. 5 shows a relationship among the first target speed, the second target speed, and the target following speed when the travel speed of the surrounding vehicle M3 is lower than the target following speed. For example, when the target following speed of the host vehicle M1 is 100 km/h and the travel speed of the surrounding vehicle M3 is 90 km/h, the control device 20 sets the calculation value a to −10 km/h based on the relative speed of the surrounding vehicle M3 with respect to the host vehicle M1, and acquires the second target speed of 90 km/h by adding the calculation value $\alpha$=−10 km/h to the target following speed of 100 km/h. That is, the host vehicle M1 decelerates from the target following speed to the second target speed.

In the above-described example, the second target speed coincides with the travel speed of the surrounding vehicle M3, and the second target speed does not necessarily coincide with the travel speed of the surrounding vehicle M3, and may also be calculated based on the travel speed of the surrounding vehicle M3. For example, the second target speed may be slightly higher or slightly lower than the travel speed of the surrounding vehicle M3.

Since the second target speed is a target speed based on the travel speed of the surrounding vehicle M3, when the preceding vehicle M2 is no longer detected, the host vehicle M1 may travel in accordance with the surrounding vehicle M3 without requiring the user to perform any additional operation such as cancellation of travel speed control, an accelerator/brake operation or resetting the first target speed. That is, the host vehicle M1 may fit in a flow of traffic in the vicinity without burden on the user.

The first target speed is generally a speed higher than the target following speed. In the example in FIG. 4, when shifting from the following travel control to the constant speed travel control based on the first target speed, since an acceleration from the target following speed of 100 km/h to the first target speed of 120 km/h is performed at once, the large increase in speed may cause discomfort to the user.

When the second target speed is lower than the first target speed, the increase in speed in the constant speed travel control based on the second target speed in the present embodiment is smaller than the increase in speed in the constant speed travel control based on the first target speed, and thus the discomfort caused to the user by the acceleration may be reduced.

The second target speed may be a target speed based also on an acceleration of the surrounding vehicle M3. That is, the second target speed may be set based on the travel speed and the acceleration of the surrounding vehicle M3. Accordingly, for example, the second target speed may be set to be relatively high when the surrounding vehicle M3 accelerates, and the second target speed may be set to be relatively low when the surrounding vehicle M3 decelerates.

Figure 6:
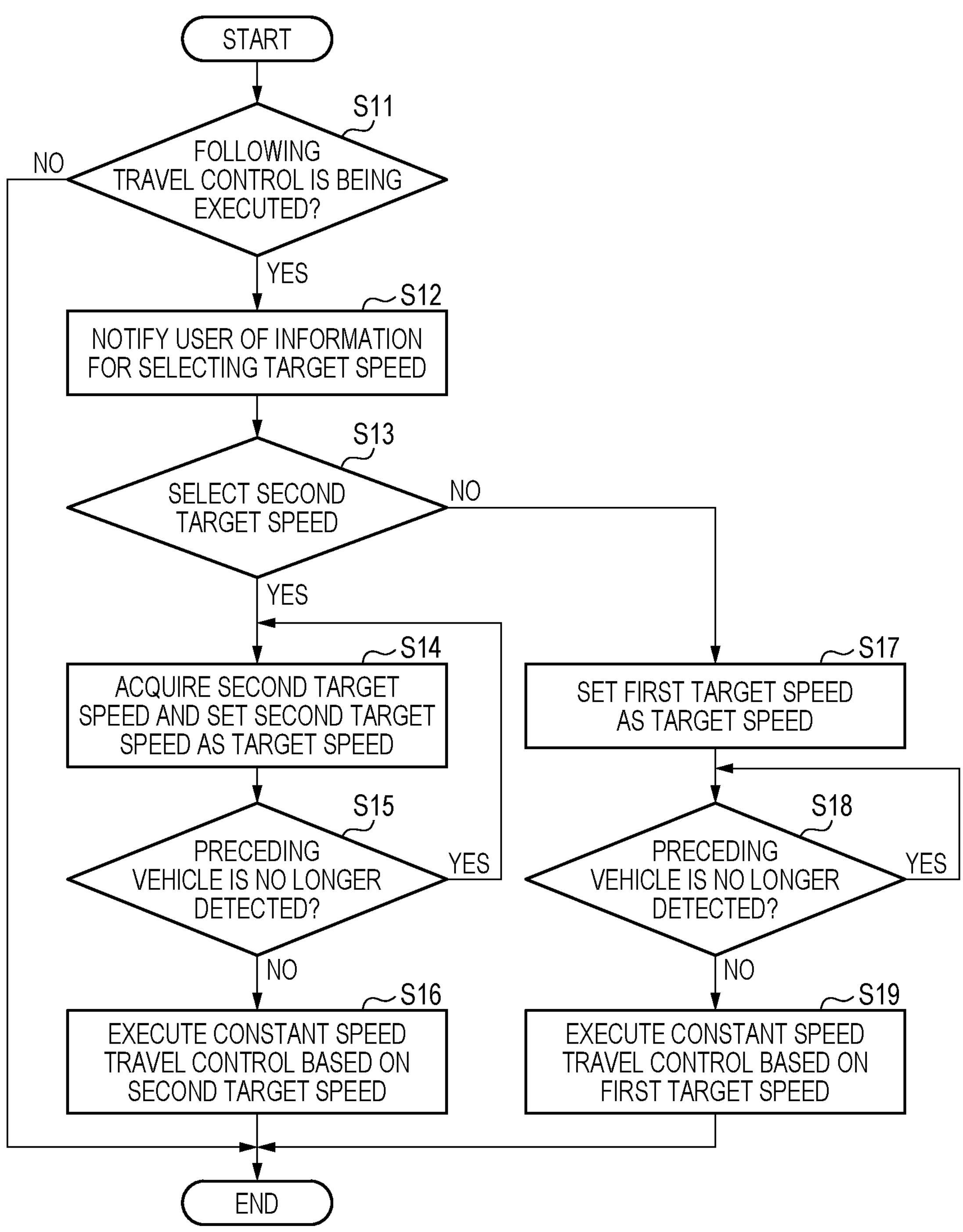
FIG. 6 is a flowchart showing an example of processing executed by the control device 20 during execution of the following travel control.

Next, an example of processing executed by the control device 20 during execution of the travel speed control will be described with reference to FIG. 6. For example, the control device 20 repeatedly executes a series of processing shown in FIG. 6 at a predetermined cycle during execution of the travel speed control.

First, the control device 20 determines whether the following travel control is being executed (step S11). When the travel speed control is being executed, the following travel control is basically continued to be executed while the preceding vehicle M2 is detected by the external environment recognition unit 15. When it is determined that the following travel control is not being executed (step S11: NO), the control device 20 ends the processing.

When it is determined that the following travel control is being executed (step S11: YES), the control device 20 notifies the user, via the notification unit 16, of information for the user to select the target speed of the constant speed travel control to be executed after the following travel control from the first target speed and the second target speed (step S12). For example, the control device 20 displays, on the display unit 161, guidance inquiring the user whether the user selects the second target speed, and thus the user may select, by using the operation unit 13, the target speed from the first target speed and the second target speed. The control device 20 may notify the user of the guidance inquiring whether the user selects the second target speed by voice through the speaker 162.

With such a configuration, the target speed of the constant speed travel control executed after the following travel control may be set based on an intention of the user. Further, by prompting the user to select the target speed during the execution of the following travel control, it is possible to smoothly shift from the following travel control to the constant speed travel control as compared to a case where the user is prompted to select the target speed after the preceding vehicle M2 is no longer detected.

Such notification may be performed only once (that is, the notification may be performed only when the following travel control is performed for a first time) each time the travel speed control is executed, or may be repeatedly performed each time the following travel control is executed.

The control device 20 determines whether the user selects the second target speed (step S13). When the user selects the second target speed (step S13: YES), the control device acquires the second target speed during the execution of the following travel control, and sets the second target speed as the target speed in the constant speed travel control (step S14). In a case where the target speed is set to the second target speed, an upper limit value of the travel speed of the host vehicle M1 during the following travel control becomes the second target speed, and the host vehicle M1 follows the preceding vehicle M2 at the second target speed or a lower speed.

By acquiring the second target speed during the execution of the following travel control, it is possible to immediately shift to the constant speed travel control based on the second target speed after the preceding vehicle M2 is no longer detected, and the host vehicle M1 may smoothly fit in the flow of traffic in the vicinity. In addition, even when the surrounding vehicle M3 is not detected (in other words, the surrounding vehicle M3 is not present) whereas the preceding vehicle M2 is no longer detected, the host vehicle M1 can travel at the second target speed, instead of the first target speed, based on the travel speed of the surrounding vehicle M3 acquired during the execution of the following travel control. Therefore, discomfort due to a speed increase may be reduced.

After acquiring and setting the second target speed as the target speed, the control device 20 determines whether the preceding vehicle M2 is no longer detected (step S15). When it is determined that the preceding vehicle M2 is detected (step S15: YES), the control device 20 returns to step S14, appropriately updates the second target speed, and repeatedly executes step S14 and step S15.

When it is determined that the preceding vehicle M2 is no longer detected (step S15: NO), the control device 20 executes the constant speed travel control under which the travel speed of the host vehicle M1 is controlled to be the second target speed (step S16), and ends the processing.

On the other hand, in step S13, when the user selects the first target speed (step S13: NO), the control device 20 sets the first target speed as the target speed in the constant speed travel control (step S17).

After setting the first target speed as the target speed, the control device 20 determines whether the preceding vehicle M2 is no longer detected (step S18). When it is determined that the preceding vehicle M2 is detected (step S18: YES), the control device 20 monitors the preceding vehicle M2 until the preceding vehicle M2 is no longer detected.

When it is determined that the preceding vehicle M2 is no longer detected (step S18: NO), the control device 20 executes the constant speed travel control under which the travel speed of the host vehicle M1 is controlled to be the first target speed (step S19), and ends the processing.

When the constant speed travel control, from the following travel control, based on the first target speed is executed in step S19, in a case where a difference between the target following speed and the first target speed is equal to or larger than a predetermined threshold value, the control device 20 preferably performs processing of lengthening a time until the travel speed reaches the first target speed from the target following speed as compared with a case where the difference is less than the threshold value. Hereinafter, such processing is also referred to as acceleration time change processing.

Figure 7:
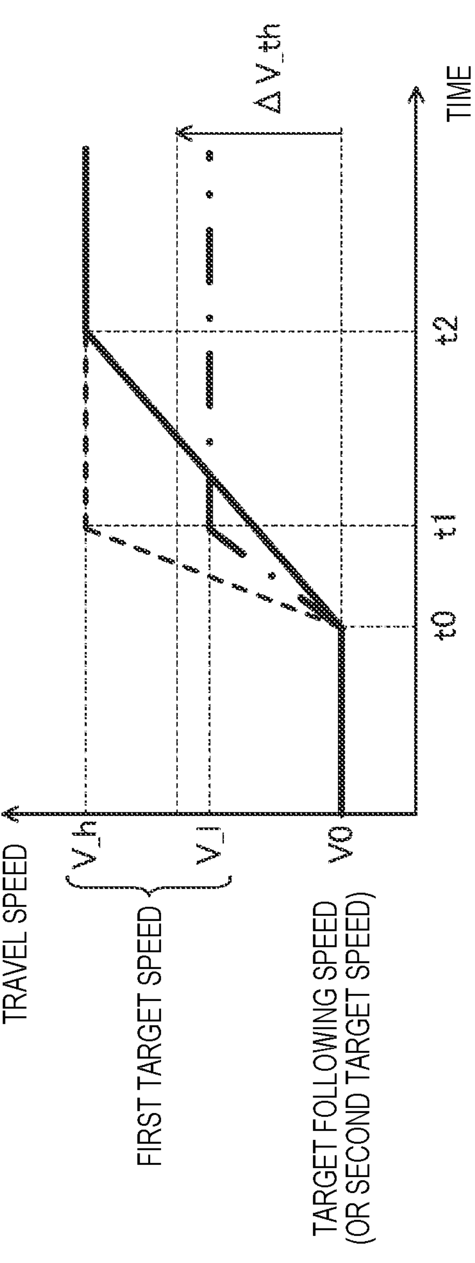
FIG. 7 is a graph showing an example of a change over time in a travel speed of the host vehicle M1 when a difference between the target following speed (or the second target speed) and a first target speed is different.

FIG. 7 is a graph showing a change over time in the travel speed of the host vehicle M1 when the difference between the target following speed and the first target speed is equal to or larger than the predetermined threshold value (hereinafter, also referred to as "a case where the speed difference is large") and a change over time in the travel speed of the host vehicle M1 when the difference between the target following speed and the first target speed is less than the predetermined threshold value (hereinafter, also referred to as "a case where the speed difference is small"). In the graph, a dot-dashed line indicates a case where the speed difference is small, a solid line indicates a case where the speed difference is large and the acceleration time change processing is performed, and a broken line indicates a case where the speed difference is large and the acceleration time change processing is not performed.

In the example shown in FIG. 7, when the speed difference is large, the host vehicle M1 accelerates from a target following speed V0 to a first target speed V_h, and when the speed difference is small, the host vehicle M1 accelerates from the target following speed V0 to a first target speed V_1 smaller than V_h. Here, a difference between V_h and V0 is equal to or larger than a predetermined threshold value AV_th (that is, V_h−V0≥ΔV_th), and a difference between V_1 and V0 is less than the predetermined threshold value AV_th (that is, V_1−V0<ΔV_th).

When the speed difference is small, the host vehicle M1 accelerates from a time t0 to a time t1. At this time, since the speed difference is small, an occupant hardly feels discomfort due to the acceleration. On the other hand, when the speed difference is large, if the acceleration time change processing is not performed (that is, the broken line in FIG. 7), the host vehicle M1 accelerates from the time t0 to the time t1. At this time, since the speed difference is large, the occupant may feel discomfort due to the rapid acceleration.

Therefore, the control device 20 lengthens, by performing the acceleration time change processing, a time for the accelerating from the target following speed V0 to the first target speed V_h. Specifically, the control device 20 sets a time from the time t0 to a time t2 after the time t1 as the time for the travel speed to reach the first target speed V_h from the target following speed V0, and accelerates the host vehicle M1 more slowly than the case where the speed difference is small. Accordingly, the host vehicle M1 is not accelerated at once, and thus it is possible to reduce the discomfort felt by the occupant due to the rapid acceleration.

After the constant speed travel control based on the second target speed is executed in step S16, the user may desire to accelerate the host vehicle M1 until a new preceding vehicle M2 is detected. Therefore, the control device 20 sets the target speed to the first target speed when a command for accelerating the host vehicle M1 is input from the user during execution of the constant speed travel control based on the second target speed. After the target speed becomes the first target speed, the constant speed travel control based on the first target speed is executed until a new preceding vehicle M2 is detected as long as there is no additional input from the user. The "command for accelerating the host vehicle M1" is, for example, an operation of stepping down an accelerator pedal detected by the AP sensor 142 or an operation of pressing an acceleration button provided on a steering wheel or the like by the user.

With such a configuration, the target speed of the constant speed travel control after the following travel control may be further increased based on the intention of the user.

Further, during execution of the constant speed travel control based on the second target speed, when a command for accelerating from the second target speed to the first target speed is input from the user, the control device 20 preferably performs processing of lengthening a time until the travel speed reaches the first target speed from the second target speed in a case where a difference between the second target speed and the first target speed is equal to or larger than a predetermined threshold value, as compared to a case where the difference is less than the threshold value. Such processing is the same as the above-described acceleration time change processing performed when performing the constant speed travel control based on the first target speed from the following travel control, and thus the target following speed V0 is replaced with the second target speed in the following description with reference to FIG. 7.

As shown in FIG. 7, when the difference between the second target speed and the first target speed is less than the predetermined threshold value AV_th (that is, when the speed difference is small), the host vehicle M1 accelerates from the time t0 to the time t1. At this time, since the speed difference is small, an occupant hardly feels discomfort due to the acceleration. On the other hand, when the difference between the second target speed and the first target speed is equal to or larger than the predetermined threshold value AVth (that is, when the speed difference is large), the host vehicle M1 accelerates from the time t0 to the time t1 without performing the acceleration time change processing (that is, the broken line in FIG. 7). At this time, since the speed difference is large, the occupant may feel discomfort due to the rapid acceleration.

Therefore, the control device 20 preferably lengthens, by performing the acceleration time change processing, an acceleration time from the second target speed V0 to the first target speed V_h. Specifically, the control device 20 sets a time from the time t0 to the time t2 after the time t1 as the time until the travel speed reaches the first target speed V_h from the second target speed V0, and accelerates the host vehicle M1 more slowly than the case where the speed difference is small. Accordingly, the host vehicle M1 is not accelerated at once, and thus it is possible to reduce the discomfort felt by the occupant due to the rapid acceleration.

(Modification)

During execution of the following travel control, when the preceding vehicle M2 is no longer detected as a result of lane-change of the host vehicle M1, the control device 20 may execute constant speed movement control under which the travel speed of the host vehicle M1 is controlled to a target speed based on a travel speed of a surrounding vehicle moving in a travel lane that is a destination travel lane.

Figure 8:
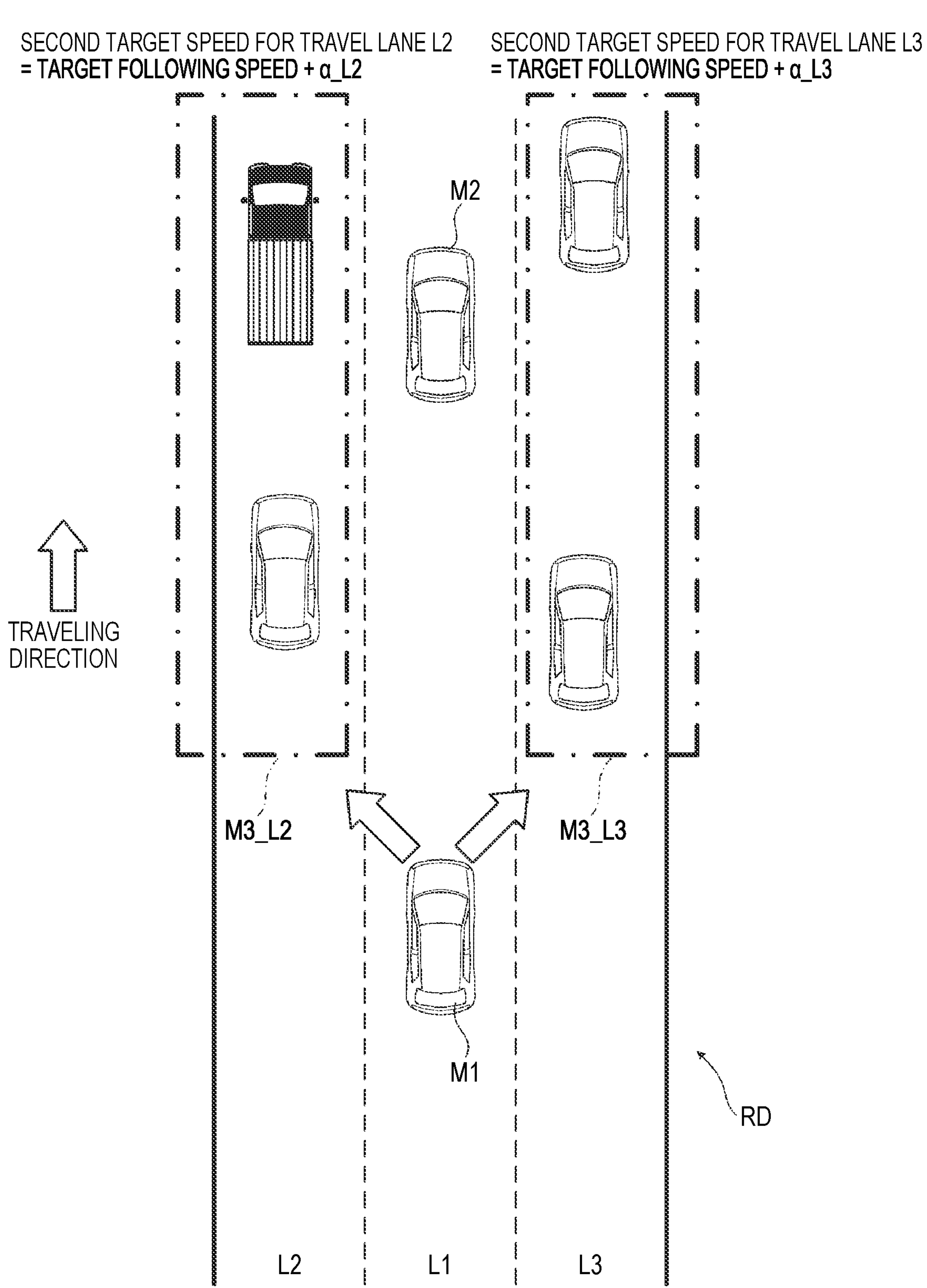
FIG. 8 shows an example of setting the second target speed for each travel lane.

In an example shown in FIG. 8, the host vehicle M1 is traveling in the travel lane L1, and the plurality of travel lanes L2 and L3 are present in the surrounding area of the host vehicle M1. The control device 20 adds, to the target following speed, a predetermined calculation value α_L2 based on a travel speed of a surrounding vehicle M3_L2 traveling in the travel lane L2 to acquire the second target speed for the travel lane L2. In addition, the control device 20 adds, to the target following speed, a predetermined calculation value α_L3 based on a travel speed of a surrounding vehicle M3_L3 traveling in the travel lane L3 to acquire the second target speed for the travel lane L3.

When the host vehicle M1 changes the travel lane from L1 to L2 during execution of the following travel control for following the preceding vehicle M2, the preceding vehicle M2 is no longer detected. At this time, the control device 20 sets the target speed to the second target speed set for the travel lane L2 and executes the constant speed travel control under which the travel speed of the host vehicle M1 is controlled to be the second target speed for the travel lane L2. In addition, when the host vehicle M1 changes the travel lane from L1 to L3 during execution of the following travel control for following the preceding vehicle M2, the preceding vehicle M2 is no longer detected. At this time, the control device 20 sets the target speed to the second target speed set for the travel lane L3 and executes the constant speed travel control under which the travel speed of the host vehicle M1 is controlled to be the second target speed for the travel lane L3.

Since the travel speed of the surrounding vehicle may be different in each travel lane, by acquiring the second target speed for each travel lane, the host vehicle M1 may travel appropriately in accordance with a travel speed of a vehicle traveling in the destination travel lane.

Second Embodiment

In the above-described first embodiment, in the constant speed travel control, the control device 20 controls the travel speed such that the host vehicle M1 reaches the first target speed or the second target speed. In addition, the second target speed is calculated based on the target following speed and the predetermined calculation value a. In a second embodiment, in the constant speed travel control, the control device 20 controls an acceleration such that the host vehicle M1 reaches the first target speed or a speed based on the movement speed of the surrounding vehicle M3. In addition, in the second embodiment, the control device 20 does not calculate the second target speed.

Hereinafter, the second embodiment will be described in detail. The configuration of the vehicle 10 (host vehicle M1) in the second embodiment is the same as that of the vehicle in the first embodiment, and thus description thereof will be omitted.

When accelerating from a current travel speed (for example, 100 km/h) to the first target speed (for example, 120 km/h) during the constant speed travel control, the control device 20 sets the acceleration to a first acceleration. The first acceleration is a predetermined value (for example, 2.5 km/h/sec) while the host vehicle M1 is accelerated to the first target speed. In addition, the first acceleration becomes 0 (zero) after reaching the first target speed. In other words, the host vehicle M1 travels at a constant speed after reaching the first target speed. The value of the first acceleration may be appropriately changed according to the travel speed of the host vehicle M1.

When accelerating from the current travel speed (for example, 100 km/h) to the speed (for example, 110 km/h) based on the movement speed of the surrounding vehicle M3 during the constant speed travel control, the control device 20 sets the acceleration to a second acceleration. The second acceleration is calculated as a predetermined positive value (for example, 1 km/h/sec) when the host vehicle M1 is accelerated to match the movement speed of the surrounding vehicle M3, is calculated as a predetermined negative value (for example, −1 km/h/sec) when the host vehicle M1 is decelerated, and is calculated as 0 (zero) when the travel speed of the host vehicle M1 reaches the movement speed of the surrounding vehicle M3 without acceleration or deceleration. That is, unlike the first acceleration, the second acceleration is calculated based on the movement speed of the surrounding vehicle M3. In addition, a magnitude (absolute value) of the second acceleration is basically set to be smaller than a magnitude of the first acceleration, and thus the occupant is prevented from feeling discomfort due to a rapid acceleration. The value of the second acceleration may be appropriately changed according to a relative speed between the host vehicle M1 and the surrounding vehicle M3.

In the second embodiment, when the preceding vehicle M2 is no longer detected during execution of the following travel control, the control device 20 executes the constant speed travel control under which the acceleration of the host vehicle M1 is controlled such that the travel speed of the host vehicle M1 becomes the speed based on the movement speed of the surrounding vehicle M3 in the constant speed travel control. Specifically, when the preceding vehicle M2 is no longer detected during the execution of the following travel control, the control device 20 sets the acceleration of the host vehicle M1 to the above-described second acceleration. Then, the control device 20 accelerates or decelerates the host vehicle M1 at the second acceleration such that the travel speed of the host vehicle M1 approaches the travel speed of the surrounding vehicle M3, and causes the host vehicle M1 to travel at a constant speed after the travel speed of the host vehicle M1 reaches the speed based on the movement speed of the surrounding vehicle M3.

In this way, in the constant speed travel control executed when the preceding vehicle M2 is no longer detected during the execution of the following travel control, the host vehicle M1 may fit in the flow of traffic in the vicinity, as in the first embodiment, by controlling the acceleration of the host vehicle M1. Therefore, when the preceding vehicle M2 is no longer detected, the host vehicle M1 may travel in accordance with the surrounding vehicle M3 without requiring the user to perform any additional operation such as cancellation of the travel speed control, an accelerator/brake operation, and resetting the first target speed.

In the second embodiment, it is preferable to acquire the second acceleration during execution of the following travel control. Accordingly, immediately after the preceding vehicle M2 is no longer detected, the acceleration of the host vehicle M1 is set to the second acceleration, and the host vehicle M1 may be accelerated or decelerated at the second acceleration to approach the travel speed of the surrounding vehicle M3. Therefore, the host vehicle M1 may smoothly fit in the flow of traffic in the vicinity.

In the second embodiment, the control device 20 may notify the user, via the notification unit 16, of information for selecting between constant speed travel control (hereinafter also referred to as first constant speed travel control) under which the host vehicle M1 is accelerated or decelerated at the second acceleration such that the travel speed of the host vehicle M1 approaches the travel speed of the surrounding vehicle M3 and constant speed travel control (hereinafter also referred to as second constant speed travel control) under which the host vehicle M1 is accelerated at the first acceleration such that the travel speed of the host vehicle M1 becomes the first target speed. When the preceding vehicle M2 is no longer detected during execution of the following travel control, the control device 20 executes the first constant speed travel control or the second constant speed travel control selected by the user. With such a configuration, the user may select whether to cause the host vehicle M1 to travel while accelerating to the first target speed or to cause the host vehicle M1 to travel in accordance with the travel speed of the surrounding vehicle M3.

The second acceleration may be an acceleration also based on the acceleration of the surrounding vehicle M3, that is, the second acceleration may be set based on the travel speed and the acceleration of the surrounding vehicle M3. Accordingly, for example, the second acceleration may be set to be relatively high when the surrounding vehicle M3 accelerates, and the second acceleration may be set to be relatively low when the surrounding vehicle M3 decelerates.

Next, processing executed by the control device 20 in the second embodiment will be described. A processing flow of the second embodiment is substantially the same as that in FIG. 6 showing the processing flow of the first embodiment, and thus will be described using FIG. 6 without being shown again. In particular, steps S12, S13, S14, S16, S17, and S19 which are different from the first embodiment will be described in detail.

In the second embodiment, in step S12, the control device 20 notifies, via the notification unit 16, the user of information for the user to select one of the first constant speed travel control and the second constant speed travel control as the constant speed travel control executed after the following travel control. Next, in step S13, the control device 20 determines whether the user selects the first constant speed travel control. When the user selects the first constant speed travel control (step S13: YES), the control device 20 acquires the second acceleration and sets the acceleration to the second acceleration in step S14. When it is determined that the preceding vehicle M2 is no longer detected (step S15: YES), the control device 20 executes the first constant speed travel control based on the second acceleration in step S16. On the other hand, when the user selects the second constant speed travel control (step S13: NO), the control device 20 sets the acceleration to the first acceleration in step S17. When it is determined that the preceding vehicle M2 is no longer detected (step S18: YES), the control device 20 executes the second constant speed travel control based on the first acceleration in step S19.

Although the embodiments of the present invention have been described above with reference to the accompanying drawings, it is needless to say that the present invention is not limited to the embodiments. It is apparent that those skilled in the art can conceive of various modifications and changes within the scope described in the claims, and it is understood that such modifications and changes naturally fall within the technical scope of the present invention. In addition, respective constituent elements in the above embodiments may be freely combined without departing from the gist of the invention.

The first embodiment described above shows the case where the second target speed is lower than the first target speed. However, the second target speed is not limited thereto and may be higher than the first target speed. In the case where the second target speed is higher than the first target speed, when shifting from the following travel control to the constant speed travel control based on the second target speed, the host vehicle M1 travels according to the travel speed of the surrounding vehicle M3 and may fit in the flow of traffic in the vicinity. In the case where the second target speed is higher than the first target speed, the control device 20 may execute the constant speed travel control based on the first target speed lower than the second target speed when the preceding vehicle M2 is no longer detected during execution of the following travel control.

In the first embodiment described above, in the case where the second target speed is lower than the first target speed, when the command for accelerating the host vehicle M1 is input from the user during execution of the constant speed travel control based on the second target speed, the control device 20 sets the target speed to the first target speed higher than the second target speed. On the other hand, in the case where the second target speed is higher than the first target speed, when the command for accelerating the host vehicle M1 is input from the user during execution of the constant speed travel control based on the second target speed, the control device 20 sets (that is, maintains) the target speed to the second target speed since the second target speed is higher than the first target speed.

In the first embodiment described above, the control device 20 acquires the second target speed during execution of the following travel control, and the invention is not limited thereto. For example, the control device 20 may acquire the second target speed after the preceding vehicle M2 is no longer detected. In addition, based on both the second target speed acquired during the execution of the following travel control and the second target speed acquired after the preceding vehicle M2 is no longer detected, the control device 20 may set one of the second target speeds as the target speed.

In the second embodiment described above, the control device 20 acquires the second acceleration during execution of the following travel control, and the invention is not limited thereto. For example, the control device 20 may acquire the second acceleration after the preceding vehicle M2 is no longer detected.

In the first embodiment described above, the control device 20 notifies, via the notification unit 16, the user of the information for selecting the target speed during execution of the following travel control, and the invention is not limited thereto. For example, the control device 20 may notify the user of the information after the preceding vehicle M2 is no longer detected. In addition, the control device 20 may execute the constant speed travel control based on the second target speed when the preceding vehicle M2 is no longer detected without notifying the user of the information.

While an example in which the moving body in the present disclosure is the vehicle which is a four-wheeled automobile is described in the above-described embodiment, the moving body is not limited thereto. The moving body in the present disclosure may be a two-wheeled automobile (so-called motorcycle), a Segway, a ship, an aircraft, or the like.

The travel speed control described in the above embodiment may be implemented by executing a control program prepared in advance on a computer. The control program is stored in a computer-readable storage medium and executed by being read from the storage medium. In addition, the control program may be provided in a form stored in a non-volatile (non-transitory) storage medium such as a flash memory, or may be provided via a network such as the Internet. The computer that executes the control program may be provided in a control device mounted on a moving body, may be provided in a terminal device such as a smartphone, a tablet terminal, or a personal computer capable of communicating with the moving body, or may be provided in a server device capable of communicating with the moving body.

In the present description, at least the following matters are described. While corresponding constituent elements and the like in the above-described embodiments are shown in parentheses as examples, the present invention is not limited thereto.

(1) A control device (a control device 20) for a moving body (a vehicle 10, a host vehicle M1), the control device being configured to execute following movement control (following travel control) under which a movement speed of the moving body is controlled to follow a preceding moving body (a preceding vehicle M2) moving ahead of the moving body, and constant speed movement control (constat speed travel control) under which the movement speed of the moving body is controlled to be a predetermined target speed (the first target speed, the second target speed), in which the control device is configured to execute, when the preceding moving body is detected, the following movement control, and execute, when the preceding moving body is no longer detected during execution of the following movement control, the constant speed movement control under which the movement speed of the moving body is controlled such that the movement speed of the moving body becomes the target speed (the second target speed) based on a movement speed of a surrounding moving body (a surrounding vehicle M3) moving in a surrounding area of the moving body.

According to (1), when the preceding moving body is no longer detected during the execution of the following movement control and the movement control is shifted from the following movement control to the constant speed movement control, the moving body may move according to the movement speed of the surrounding moving body without requiring the user to perform any additional operation, and may fit in a flow of traffic in the vicinity.

(2) The control device for a moving body according to (1), in which the target speed is acquired based on the movement speed of the surrounding moving body during execution of the following movement control.

According to (2), the target speed based on the movement speed of the surrounding moving body is acquired during the execution of the following movement control, so that the constant speed movement control under which the movement speed of the moving body is controlled to be the target speed based on the movement speed of the surrounding moving body may be executed immediately after the preceding moving body is no longer detected. Therefore, the moving body may smoothly fit in the flow of traffic in the vicinity.

(3) The control device for a moving body according to (1) or (2), in which the target speed is selectively set from a first target speed preset by a user of the moving body and a second target speed based on the movement speed of the surrounding moving body, and the control device is configured to notify the user, via a notification unit (a notification unit 16), of information for the user to select the target speed from the first target speed and the second target speed.

According to (3), it is possible to set the target speed in the constant speed movement control executed after the end of the following movement control based on an intention of the user.

(4) The control device for a moving body according to (3), in which, when the preceding moving body is detected, the following movement control is executed to control the movement speed of the moving body such that the moving body moves at a target following speed set based on a relative speed or a relative position with respect to the preceding moving body, in a case where the user selects the first target speed as the target speed, when the preceding moving body is no longer detected during execution of the following movement control, the constant speed movement control is executed to control the movement speed of the moving body to be the first target speed, and, when shifting from the following movement control to the constant speed movement control based on the first target speed, in a case where a difference between the target following speed and the first target speed is equal to or larger than a predetermined threshold value ($\Delta V\_th$), a time until the moving speed reaches the first target speed from the target following speed is lengthened than in a case where the difference is less than the threshold value.

According to (4), when the constant speed movement control based on the first target speed is executed from the following movement control, and the difference between the target following speed and the first target speed is large, the host vehicle M1 is slowly accelerated. Accordingly, the host vehicle M1 is not accelerated at once, and thus it is possible to reduce the discomfort felt by the occupant due to the rapid acceleration.

(5) The control device for a moving body according to any one of (1) to (4), in which the target speed is selectively set from a first target speed preset by a user of the moving body and a second target speed based on the movement speed of the surrounding moving body, and the control device is configured to set, when a command for accelerating the moving body is input from the user during execution of the constant speed movement control based on the second target speed, the target speed to a higher one of the first target speed and the second target speed.

According to (5), the target speed in the constant speed movement control after the following movement control may be further increased based on the intention of the user.

(6) The control device for a moving body according to any one of (1) to (5), in which the target speed is selectively set from a first target speed preset by a user of the moving body and a second target speed based on the movement speed of the surrounding moving body, the first target speed is higher than the second target speed, the control device is configured to change the target speed from the second target speed to the first target speed when a command for accelerating the moving body is input from the user during execution of the constant speed movement control based on the second target speed, and, when the target speed is changed from the second target speed to the first target speed, in a case where a difference between the second target speed and the first target speed is equal to or higher than a predetermined threshold value ($\Delta V\_th$), a time until the target speed reaches the first target speed from the second target speed is lengthened than in a case where the difference is less than the threshold value.

According to (6), when the target speed is changed from the second target speed to the first target speed and the difference between the second target speed and the first target speed is large, the host vehicle M1 is slowly accelerated. Accordingly, the host vehicle M1 is not accelerated at once, and thus it is possible to reduce the discomfort felt by the occupant due to the rapid acceleration.

(7) The control device for a moving body according to any one of (1) to (6), in which, when the moving body changes a travel lane to a destination travel lane among a plurality of travel lanes (travel lanes L1, L2, L3) in the surrounding area of the moving body, the control device is configured to execute the constant speed movement control under which the movement speed of the moving body is controlled to reach the target speed based on the movement speed of the surrounding moving body moving in the destination travel lane among the surrounding moving bodies.

The movement speed of the surrounding moving body may be different in each travel lane. According to (7), the moving body may travel appropriately according to the movement speed of the surrounding moving body traveling in the destination travel lane.

(8) The control device for a moving body according to any one of (1) to (7), in which the target speed is set based on the movement speed and an acceleration of the surrounding moving body.

According to (8), it is possible to appropriately set the target speed of the moving body according to acceleration or deceleration of the surrounding moving body.

(9) A control device (a control device 20) for a moving body (a vehicle 10, a host vehicle M1), the control device being configured to execute following movement control (following travel control) under which a movement speed of a moving body is controlled to follow a preceding moving body (a preceding vehicle M2) moving ahead of the moving body, and constant speed movement control (constant speed travel control) under which the movement speed of the moving body is controlled to be a predetermined speed (the first target speed, the speed based on the travel speed of surrounding vehicle M3), in which the control device is configured to execute, when the preceding moving body is detected, the following movement control, and execute, when the preceding moving body is no longer detected during execution of the following movement control, the constant speed movement control under which an acceleration of the moving body is controlled such that the movement speed of the moving body becomes a speed based on a movement speed of a surrounding moving body (a surrounding vehicle M3) moving in a surrounding area of the moving body.

According to (9), when the preceding moving body is no longer detected during the execution of the following movement control and the movement control is shifted from the following movement control to the constant speed movement control, the moving body may move according to the movement speed of the surrounding moving body without requiring the user to perform any additional operation, and may fit in a flow of traffic in the vicinity.

(10) The control device for a moving body according to (9), in which, when the preceding moving body is no longer detected during execution of the following movement control, the moving body is accelerated or decelerated at a predetermined acceleration (the second acceleration) based on the movement speed of the surrounding moving body, and the predetermined acceleration is acquired during the execution of the following movement control.

According to (10), the predetermined acceleration based on the movement speed of the surrounding moving body is acquired during the execution of the following movement control, so that the acceleration of the moving body may be immediately set to the predetermined acceleration after the preceding moving body is no longer detected, and the moving body may be accelerated or decelerated at the predetermined acceleration to approach the movement speed of the surrounding moving body. Therefore, the moving body may smoothly fit in the flow of traffic in the vicinity.

(11) The control device for a moving body according to (9) or (10), in which the control device is configured to execute a first constant speed movement control as the constant speed movement control under which the acceleration of the moving body is controlled such that the movement speed of the moving body becomes the speed based on the movement speed of the surrounding moving body, and a second constant speed movement control under which the acceleration of the moving body is controlled such that the movement speed of the moving body becomes a target speed preset by a user, notify the user, via a notification unit (a notification unit 16), of information for selecting whether to execute the first constant speed movement control or the second constant speed movement control, and execute, when the preceding moving body is no longer detected during execution of the following movement control, one of the first constant speed movement control and the second constant speed movement control selected by the user.

According to (11), the user may select whether to move the moving body according to the movement speed of the surrounding moving body or to move the moving body while accelerating the moving body to the target speed set in advance by the user.

(12) The control device for a moving body according to (10), in which the predetermined acceleration is set based on the movement speed and an acceleration of the surrounding moving body.

According to (12), it is possible to appropriately set the acceleration of the moving body according to the acceleration or deceleration of the surrounding moving body.

(13) A control method for a moving body, including:

executing, by a computer, following movement control under which a movement speed of a moving body is controlled to follow a preceding moving body moving ahead of the moving body when the preceding moving body is detected, and constant speed movement control under which the movement speed or an acceleration of the moving body is controlled such that the movement speed of the moving body becomes a speed based on a movement speed of a surrounding moving body moving in a surrounding area of the moving body when the preceding moving body is no longer detected during execution of the following movement control.

According to (13), when the preceding moving body is no longer detected during the execution of the following movement control and the movement control is shifted from the following movement control to the constant speed movement control, the moving body may move according to the movement speed of the surrounding moving body without requiring the user to perform any additional operation, and may fit in a flow of traffic in the vicinity.

(14) A non-transitory computer readable storage medium storing a control program for a moving body causing a computer to execute the control method according to (13).

According to (14), when the preceding moving body is no longer detected during the execution of the following movement control and the movement control is shifted from the following movement control to the constant speed movement control, the moving body may move according to the movement speed of the surrounding moving body without requiring the user to perform any additional operation, and may fit in a flow of traffic in the vicinity.

What is claimed is:

1. A control device for a moving body, the control device being configured to execute following movement control under which a movement speed of a moving body is controlled to follow a preceding moving body moving ahead of the moving body, and constant speed movement control under which the movement speed of the moving body is controlled to be a predetermined target speed, wherein the control device is configured to execute, when the preceding moving body is detected, the following movement control, and execute, when the preceding moving body is no longer detected during execution of the following movement control, the constant speed movement control under which the movement speed of the moving body is controlled such that the movement speed of the moving body becomes the target speed based on a movement speed of a surrounding moving body moving in a surrounding area of the moving body, the target speed is selectively set from a first target speed preset by a user of the moving body and a second target speed based on the movement speed of the surrounding moving body, the control device is configured to notify the user, via a notifier, of information for the user to select the target speed from the first target speed and the second target speed, and when the preceding moving body is detected, the following movement control is executed to control the movement speed of the moving body such that the moving body moves at a target following speed set based on a relative speed or a relative position with respect to the preceding moving body, in a case where the user selects the first target speed as the target speed, when the preceding moving body is no longer detected during execution of the following movement control, the constant speed movement control is executed to control the movement speed of the moving body to be the first target speed, and when shifting from the following movement control to the constant speed movement control based on the first target speed, in a case where a difference between the target following speed and the first target speed is equal to or larger than a predetermined threshold value, a time until the movement speed reaches the first target speed from the target following speed is lengthened than in a case where the difference is less than the threshold value.

2. The control device for a moving body according to claim 1, wherein the target speed is acquired based on the movement speed of the surrounding moving body during execution of the following movement control.

3. The control device for a moving body according to claim 1, wherein the control device is configured to set, when a command for accelerating the moving body is input from the user during execution of the constant speed movement control based on the second target speed, the target speed to a higher one of the first target speed and the second target speed.

4. The control device for a moving body according to claim 1, wherein the first target speed is higher than the second target speed, the control device is configured to change the target speed from the second target speed to the first target speed when a command for accelerating the moving body is input from the user during execution of the constant speed movement control based on the second target speed, and, when the target speed is changed from the second target speed to the first target speed, in a case where a difference between the second target speed and the first target speed is equal to or higher than a predetermined threshold value, a time until the target speed reaches the first target speed from the second target speed is lengthened than in a case where the difference is less than the threshold value.

5. The control device for a moving body according to claim 1, wherein, when the moving body changes a travel lane to a destination travel lane among a plurality of travel lanes in the surrounding area of the moving body, the control device is configured to execute the constant speed movement control under which the movement speed of the moving body is controlled to reach the target speed based on the movement speed of the surrounding moving body moving in the destination travel lane among the surrounding moving bodies.

6. The control device for a moving body according to claim 1, wherein the target speed is set based on the movement speed and an acceleration of the surrounding moving body.

7. A control method for a moving body, comprising:

executing, by a computer, following movement control under which a movement speed of a moving body is controlled to follow a preceding moving body moving ahead of the moving body when the preceding moving body is detected, constant speed movement control under which the movement speed or an acceleration of the moving body is controlled such that the movement speed of the moving body becomes a predetermined target speed based on a movement speed of a surrounding moving body moving in a surrounding area of the moving body when the preceding moving body is no longer detected during execution of the following movement control, wherein the target speed is selectively set from a first target speed preset by a user of the moving body and a second target speed based on the movement speed of the surrounding moving body, and outputting to the user, via a notifier, information for the user to select the target speed from the first target speed and the second target speed, wherein when the preceding moving body is detected, the following movement control is executed to control the movement speed of the moving body such that the moving body moves at a target following speed set based on a relative speed or a relative position with respect to the preceding moving body, in a case where the user selects the first target speed as the target speed, when the preceding moving body is no longer detected during execution of the following movement control, the constant speed movement control is executed to control the movement speed of the moving body to be the first target speed, and when shifting from the following movement control to the constant speed movement control based on the first target speed, in a case where a difference between the target following speed and the first target speed is equal to or larger than a predetermined threshold value, a time until the movement speed reaches the first target speed from the target following speed is lengthened than in a case where the difference is less than the threshold value.

8. A non-transitory computer readable storage medium storing a control program for a moving body causing a computer to execute the control method according to claim 7.

9. The control device for a moving body according to claim 1, wherein the target speed is calculated based on the movement speed of the surrounding moving body.

10. A control device for a moving body, the control device being configured to execute following movement control under which a movement speed of a moving body is controlled to follow a preceding moving body moving ahead of the moving body, and constant speed movement control under which the movement speed of the moving body is controlled to be a predetermined target speed, wherein the control device is configured to execute, when the preceding moving body is detected, the following movement control, and execute, when the preceding moving body is no longer detected during execution of the following movement control, the constant speed movement control under which the movement speed of the moving body is controlled such that the movement speed of the moving body becomes the target speed based on a movement speed of a surrounding moving body moving in a surrounding area of the moving body, the target speed is selectively set from a first target speed preset by a user of the moving body and a second target speed based on the movement speed of the surrounding moving body, the first target speed is higher than the second target speed, the control device is configured to change the target speed from the second target speed to the first target speed when a command for accelerating the moving body is input from the user during execution of the constant speed movement control based on the second target speed, and, when the target speed is changed from the second target speed to the first target speed, in a case where a difference between the second target speed and the first target speed is equal to or higher than a predetermined threshold value, a time until the target speed reaches the first target speed from the second target speed is lengthened than in a case where the difference is less than the threshold value.

11. The control device for a moving body according to claim 10, wherein the control device is configured to set, when a command for accelerating the moving body is input from the user during execution of the constant speed movement control based on the second target speed, the target speed to a higher one of the first target speed and the second target speed.

12. The control device for a moving body according to claim 10, wherein, when the moving body changes a travel lane to a destination travel lane among a plurality of travel lanes in the surrounding area of the moving body, the control device is configured to execute the constant speed movement control under which the movement speed of the moving body is controlled to reach the target speed based on the movement speed of the surrounding moving body moving in the destination travel lane among the surrounding moving bodies.

13. The control device for a moving body according to claim 10, wherein the target speed is set based on the movement speed and an acceleration of the surrounding moving body.

* * * * *